(12) United States Patent
Yoneda

(10) Patent No.: US 11,295,422 B2
(45) Date of Patent: Apr. 5, 2022

(54) IMAGE PROCESSING APPARATUS HAVING IMAGE ADJUSTMENT BASED ON DYNAMIC RANGE, IMAGE PROCESSING METHOD, AND STORAGE MEDIUM

(71) Applicant: CANON KABUSHIKI KAISHA, Tokyo (JP)

(72) Inventor: Naoto Yoneda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 16/530,490

(22) Filed: Aug. 2, 2019

(65) Prior Publication Data

US 2020/0051223 A1 Feb. 13, 2020

(30) Foreign Application Priority Data

Aug. 7, 2018 (JP) .............................. JP2018-148408

(51) Int. Cl.
*G06T 5/00* (2006.01)

(52) U.S. Cl.
CPC .......... *G06T 5/009* (2013.01); *G06T 2200/24* (2013.01); *G06T 2207/10024* (2013.01); *G06T 2207/20092* (2013.01); *G06T 2207/20208* (2013.01)

(58) Field of Classification Search
CPC ........... G06T 5/009; G06T 2207/20208; G06T 2207/20092; G06T 2207/10024; G06T 2200/24
See application file for complete search history.

(56) References Cited

U.S. PATENT DOCUMENTS

| 9,990,704 B2 * | 6/2018 | Nakatani | G06T 5/50 |
| 2009/0086074 A1* | 4/2009 | Li | H04N 5/2353 348/308 |
| 2015/0356904 A1* | 12/2015 | Nakatani | G09G 5/377 345/690 |
| 2017/0280023 A1* | 9/2017 | Kobayashi | G06K 15/02 |

FOREIGN PATENT DOCUMENTS

| CN | 104811688 B | * | 9/2017 | |
| JP | 2012226219 A | * | 11/2012 | ......... G06K 15/4095 |
| JP | 2017139613 A | * | 8/2017 | |
| JP | 2018-60075 A | | 4/2018 | |
| WO | WO-2017094482 A1 | * | 6/2017 | ........... H04N 19/177 |

* cited by examiner

*Primary Examiner* — Matthew C Bella
*Assistant Examiner* — Kathleen M Broughton
(74) *Attorney, Agent, or Firm* — Canon U.S.A., Inc. IP Division

(57) ABSTRACT

An image processing apparatus includes a first adjusting unit, a second adjusting unit, and a notification unit, implemented via at least one processor. The first adjusting unit is configured to switch and perform, on a raw image, a first dynamic range image adjustment suitable for a first dynamic range and a second dynamic range image adjustment suitable for a second dynamic range wider than the first dynamic range. The second adjusting unit is configured to perform a second image adjustment on an image after the first dynamic range image adjustment or the second dynamic range image adjustment. The notification unit is configured to, in a case where an operation for switching the first dynamic range image adjustment and the second dynamic range image adjustment is performed, make a notification about an adjustment parameter used in the second image adjustment.

15 Claims, 9 Drawing Sheets

IMAGE PROCESSING APPARATUS HAVING IMAGE ADJUSTMENT BASED ON DYNAMIC RANGE, IMAGE PROCESSING METHOD, AND STORAGE MEDIUM

BACKGROUND

Field

The present disclosure relates to an image processing technique for apparatuses capable of performing image adjustment.

Description of the Related Art

An environment in which images in a high dynamic range (hereinafter referred to as HDR) can be adjusted and displayed is becoming widespread. Along with this, a system capable of performing image adjustment and display suitable for the HDR environment in a color gamut of HDR has appeared. Meanwhile, since a known standard dynamic range (hereinafter referred to as SDR) display environment continues to be used, image adjustment and display suitable for the SDR environment are still necessary. For this reason, a system capable of switching and performing the image adjustment and display suitable for the SDR environment and the image adjustment and display suitable for the HDR environment has appeared.

Japanese Patent Laid-Open No. 2018-60075 discloses an information processing apparatus that adjusts luminance parameters for optimum display when dynamic ranges of an image and a display device are the same, for example, and that notifies the user of necessity of a parameter adjusting operation when a display device is newly connected, for example. In other words, Japanese Patent Laid-Open No. 2018-60075 discloses that, when display in a display environment different from a display environment in which image adjustment is performed is needed, the user is notified of the fact and prompted to adjust the parameters.

Examples of the image adjustment suitable for each of the HDR environment and the SDR environment include gamma processing (γ processing). Examples of the image adjustment for the SDR environment include γ processing using a gamma characteristic (γ characteristic) of 1/2.2. Examples of the image adjustment for the HDR environment include γ processing using a γ characteristic of a perceptual quantization (PQ) system. The image adjustment using these γ characteristics is often performed during or after raw data development processing, for example. In the image adjustment, adjustment parameters that the user freely specifies or adjustment parameters separately prepared are also often set.

The image adjustment including the γ processing, the image adjustment using user-specified adjustment parameters, and the image adjustment using adjustment parameters separately prepared, described above, are generally performed on SDR images or HDR images. In the system capable of switching and performing image adjustment and display suitable for the SDR environment and image adjustment and display suitable for the HDR environment, the image adjustments and displays are freely switched. However, the characteristics of an image adjusted for the SDR environment and an image adjusted for the HDR environment significantly differ. For this reason, for example, if adjustment parameters are continuously used when image adjustments are switched, if adjustment parameters that the user freely specifies are set, or if adjustment parameters separately prepared are set, the adjusted image can be an image with characteristics different from the characteristics expected in the image adjustment.

SUMMARY

An aspect of embodiments prevents an adjusted image from becoming an image with characteristics different from characteristics expected in image adjustment to enable adjustment of adjustment parameters at the image adjustment so as to match respective characteristics of an SDR environment and an HDR environment.

According to an aspect of the present disclosure, an image processing apparatus includes a first adjusting unit, a second adjusting unit, and a notification unit. The first adjusting unit is configured to switch and perform, on a raw image, a first dynamic range image adjustment suitable for a first dynamic range and a second dynamic range image adjustment suitable for a second dynamic range wider than the first dynamic range. The second adjusting unit is configured to perform a second image adjustment on an image after the first image dynamic range adjustment or the second image dynamic range adjustment. The notification unit is configured to, in a case where an operation for switching the first dynamic range image adjustment and the second dynamic range image adjustment is performed, make a notification about an adjustment parameter used in the second image adjustment, wherein the first adjusting unit, the second adjusting unit, and the notification unit are implemented via at least one processor.

Further features will become apparent from the following description of exemplary embodiments with reference to the attached drawings.

DESCRIPTION OF THE EMBODIMENTS

An embodiment of the present disclosure will be described in detail hereinafter with reference to the attached drawings.

Configuration of Imaging Apparatus

Figure 1:
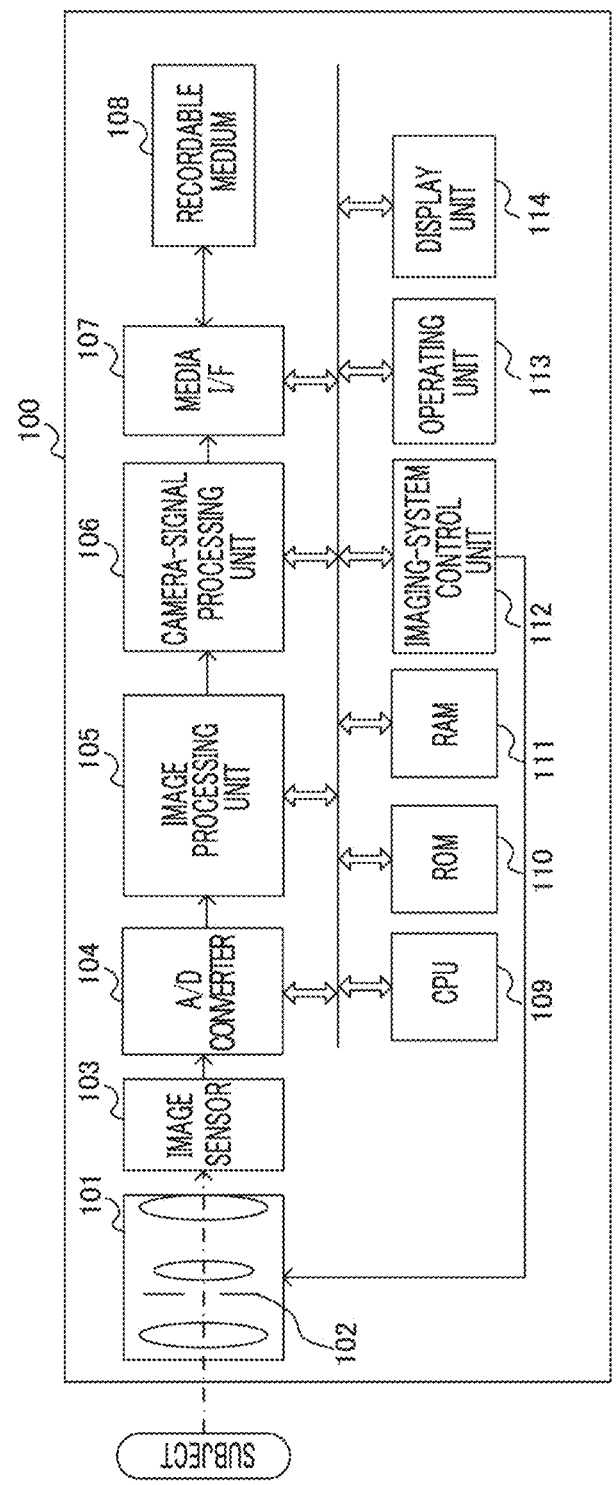
FIG. 1 is a block diagram illustrating a schematic configuration of a digital camera.

FIG. 1 is a block diagram illustrating a schematic configuration example of an imaging apparatus (a digital camera 100) that captures an image to be subjected to image adjustment described later by an image processing apparatus of the present embodiment.

In the digital camera 100 illustrated in FIG. 1, imaging lenses 101 form an optical image of a subject or the like on an image sensor 103. The imaging lenses 101 include a focus lens, a zoom lens, a blur correction lens, and an aperture 102. The image sensor 103 converts the optical image formed by the imaging lenses 101 to an electrical signal. An analog-to-digital (A/D) converter 104 converts an analog signal output from the image sensor 103 to digital data.

The data output from the A/D converter 104 is sent as so-called raw image data to an image processing unit 105 or directly to a camera-signal processing unit 106.

The data output from the A/D converter 104 is processed by the image processing unit 105, then processed by the camera-signal processing unit 106, or processed by the camera-signal processing unit 106 without passing through the image processing unit 105, and is thereafter temporarily stored in a random access memory (RAM) 111.

The image processing unit 105 is capable of developing raw image data (hereinafter referred to as "raw image") and performs predetermined de-mosaicing processing, color conversion processing, or the like on the raw image output from the A/D converter 104 or the RAM 111. The image processing unit 105 is also capable of performing image adjustment processing operations (to be described later). The image data processed by the image processing unit 105 is temporarily stored in the RAM 111 or sent to the camera-signal processing unit 106.

For example, the camera-signal processing unit 106 performs processing for generating display data to be displayed on a display unit 114, processing for compressing the image data processed by the image processing unit 105, and processing for generating a record file. The display data generated by the camera-signal processing unit 106 is temporarily stored in the RAM 111 and thereafter sent to the display unit 114. The record file is sent to a media interface (I/F) 107.

The display unit 114 is an image display device including a thin film transistor (TFT), a light emitting diode (LED), and the like and displays, for example, an image based on the display image data written to the RAM 111. When images based on the captured image data are displayed on the display unit 114 one after another, a so-called live view function is implemented.

The media I/F 107 records, in a recordable medium 108 such as a secure digital (SD) card, the image data compressed by the camera-signal processing unit 106 or the record file generated from the raw image.

The RAM 111 is a memory capable of temporarily storing captured still image data and moving image data, display data, or the like. The RAM 111 has a storage capacity sufficient to store a predetermined number of still images or moving images for a predetermined time. This allows the RAM 111 to store a large volume of images at high speed even in continuous image capturing in which multiple still images are continuously captured. The RAM 111 is also capable of storing, for example, defective pixel information from the image sensor 103.

A read-only memory (ROM) 110 is a non-volatile memory that stores control programs or instructions for the digital camera 100, various setting values, and the like.

A central processing unit (CPU) 109 controls the entire system, various types of processing, and operation of the digital camera 100 by executing the control programs or instructions stored in the ROM 110. The control programs or the instructions, when executed by the CPU 109, cause the CPU 109 to perform operations described in the following.

An operating unit 113 includes various operating members, such as a shutter switch, a power button, a menu button, and a touch panel (not illustrated), and a circuit that generates operation signals according to operations of the operating members. The operation signals from the operating unit 113 are sent to the CPU 109 or an imaging-system control unit 112. The shutter switch is a button that can be half pressed and fully pressed.

When the shutter button is half pressed, the imaging-system control unit 112 gives an instruction to start processing for driving the aperture 102 of the imaging lenses 101, automatic focusing (AF), automatic exposure (AE), automatic white balancing (AWB), electronic flash (EF, pre-flash), and other operations. Such processing and operations when the shutter button is half pressed are continued until the half press is released.

When the shutter button is then fully pressed, the imaging-system control unit 112 controls the image sensor 103 to capture an image, and the signal read from the image sensor 103 is converted from analog to digital by the A/D converter 104. The image processing unit 105 and the camera-signal processing unit 106 operate under the control of the CPU 109, so that the image data is accumulated to and read from the RAM 111. The record file generated by the camera-signal processing unit 106 is recorded in the recordable medium 108 by the media I/F 107.

A series of the processing and operations of the digital camera 100 is performed under the control of the CPU 109. The CPU 109 executes the control programs stored in the ROM 110 to control the above-described series of the processing and operations of the digital camera 100 as described in the following.

The digital camera 100 of the present embodiment is capable of setting a normal recording mode of developing a raw image captured by the image sensor 103 and recording the developed data, and also setting a RAW recording mode of recording the raw image, for example.

In the normal recording mode, the image processing unit 105 performs, as the development processing, predetermined de-mosaicing processing and color conversion processing described above. In the development processing, the image processing unit 105 performs white balance processing, digital gain processing, noise reduction processing, correction processing according to lens characteristics, correction processing according to a preset image capturing mode, and the like. The camera-signal processing unit 106 performs predetermined compression processing on the image data after the development processing and adds various data items including image capturing conditions to generate an image record file. The record file is recorded in the recordable medium 108 via the media I/F 107.

When the RAW recording mode is set, the image processing unit 105 sends the raw image to the camera-signal processing unit 106 without performing development processing. The camera-signal processing unit 106 adds various data items including image capturing conditions or the like to the raw image to generate a raw image record file. The raw image record file is recorded in the recordable medium 108 via the media I/F 107.

Description of Image Processing Apparatus of the Present Embodiment

The image processing apparatus of the present embodiment has a function of, for example, obtaining a record file of a raw image captured and recorded by the digital camera 100 and developing the raw image in the record file. The image processing apparatus of the present embodiment further has a function of switching and performing, in development processing, image adjustment suitable for an SDR environment and image adjustment suitable for an HDR environment. In the following description, the image adjustment suitable for the SDR environment is referred to as SDR image adjustment (standard dynamic range image adjustment), and the image adjustment suitable for the HDR is referred to as HDR image adjustment (high dynamic range image adjustment). Selection for switching between the SDR image adjustment and the HDR image adjustment can be, for example, freely made by the user. The SDR environment is an environment in which image adjustment and display are possible in a known standard dynamic range (SDR, a first dynamic range). The HDR environment is an environment in which image adjustment and display are possible in a high dynamic range (HDR, a second dynamic range) wider than the SDR.

In the present embodiment, the image adjustment performed by the image processing apparatus will be described in two parts: image adjustment from development processing to gamma processing (γ processing) and subsequent image adjustment performed on an image after the image adjustment. The image adjustment from the development processing to the gamma processing (γ processing) includes white balance processing, digital gain processing, noise reduction processing, correction processing according to lens characteristics, and correction processing according to a preset image capturing mode. In the γ processing, γ of 1/2.2, for example, is used as a gamma characteristic (γ characteristic) suitable particularly for the SDR environment, and γ of the perceptual quantization (PQ) system, for example, is used as a γ characteristic suitable for the HDR environment. In other words, in the image processing apparatus of the present embodiment, when SDR image adjustment is performed, a γ characteristic of 1/2.2 is particularly employed, and when HDR image adjustment is performed, a γ characteristic of the PQ system is particularly employed. Examples of the image adjustment after the γ processing include at least one of RGB tone curve adjustment, specific-color adjustment (8-axis color adjustment), partial adjustment in the image, copy stamp processing of copying and pasting an area in the image, trimming processing, rotation processing, and scaling processing. The image processing apparatus of the present embodiment is also capable of setting, at the image adjustment, adjustment parameters that the user freely specifies or an adjustment parameter set (recipe) separately prepared.

In the following description, the image adjustment described above from the development processing to the γ processing is referred to as a first image adjustment. In the present embodiment, in particular, within the first image adjustment, the image adjustment suitable for the SDR environment is referred to as SDR image adjustment, and the image adjustment suitable for the HDR environment is referred to as HDR image adjustment. The image adjustment performed after the first image adjustment is referred to as a second image adjustment. In the present embodiment, the adjustment parameters used in the first image adjustment are referred to as first adjustment parameters, and the adjustment parameters used in the second image adjustment are referred to as second adjustment parameters. Examples of the first adjustment parameters include respective setting values for the white balance processing, the digital gain processing, the noise reduction processing, the lens characteristics correction processing, the preset image capturing mode, and the γ processing, described above. Examples of the second adjustment parameters include respective setting values for the RGB tone curve adjustment, the specific-color adjustment (8-axis color adjustment), the partial adjustment, the copy stamp processing, the trimming processing, the rotation processing, and the scaling processing, described above.

Figure 2:
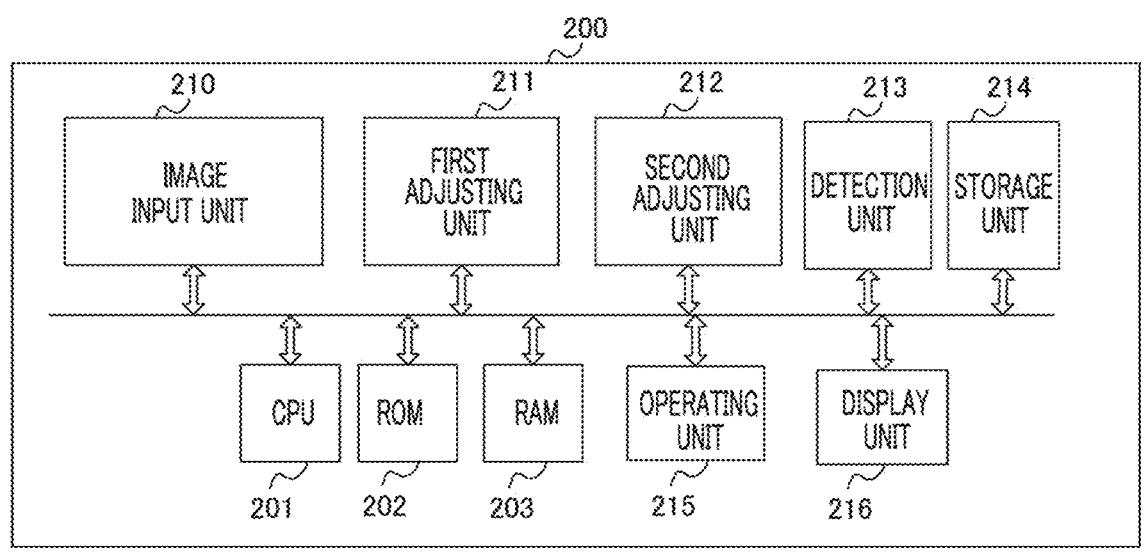
FIG. 2 is a block diagram illustrating a schematic configuration of an image processing apparatus.

FIG. 2 is a block diagram illustrating a schematic configuration example of an image processing apparatus 200 of the present embodiment having the above functions. The image processing unit 105 is an image processing device included in the digital cam ra 100. The image processing apparatus<200 is an image processing device different from the digital camera 100. The image processing unit 105 and the image processing apparatus 200 are different from eac h other. As illustrated in FIG. 2, the image processing apparatus 200 in the present embodiment is a personal computer (PC) including a CPU 201, a ROM 202, a RAM 203, a display device (not illustrated), an operating device (not illustrated), and the like. In the present embodiment, the PC can execute various types of processing, such as the first image adjustment and the second image adjustment, described above, according to an image processing application program (hereinafter referred to as an image adjustment application) according to the present embodiment. Although details will be described later, in the present embodiment, the CPU 201 implements functions of an image input unit 210, a first adjusting unit 211, a second adjusting unit 212, a detection unit 213, a storage unit 214, an operating unit 215, and a display unit 216 in FIG. 2 by executing the image adjustment application of the present embodiment. The image adjustment application according to the present embodiment is not limited to a case of being stored in advance, for example, in the ROM 202, and may be obtained from a recordable medium such as an external memory (not illustrated), or may be obtained via a network or the like (not illustrated).

The ROM 202 is a non-volatile memory that stores control programs for the image processing apparatus 200, which is a PC, and also various applications including the image adjustment application of the present embodiment, various setting data items, and the like.

The RAM 203 is a memory capable of storing the raw image record file, the first adjustment parameters, the second adjustment parameters, and the like.

The CPU 201 controls the entire PC and various types of processing and operations by executing the control programs stored in the ROM 202. The CPU 201 also executes, for example, development processing and image adjustment on the raw image in the record file that is temporarily stored in the RAM 203 by executing the image adjustment application according to the present embodiment.

The image input unit 210, the first adjusting unit 211, the second adjusting unit 212, the detection unit 213, the storage unit 214, the operating unit 215, and the display unit 216 illustrated in FIG. 2 are functional units implemented when the CPU 201 executes the control programs and the image adjustment application. In other words, although the image input unit 210 to the display unit 216 are separate from the CPU 201 in FIG. 2, the image input unit 210 to the display unit 216 are functional units implemented by the CPU 201 executing the image adjustment application. The image input unit 210 to the display unit 216 may be implemented by a software configuration using the image adjustment application or a hardware configuration, or alternatively, partially by a hardware configuration and the remaining by a software configuration.

The image input unit 210 is a processing unit that obtains a record file of an image captured and recorded, for example, by the digital camera 100 illustrated in FIG. 1. In other words, the image input unit 210 in the present embodiment obtains a record file of a raw image read from, for example, the recordable medium 108 in FIG. 1. The image input unit 210 may obtain the record file using communications via a network (not illustrated) or the like.

The storage unit 214 is a processing unit for storing the first adjustment parameters for use in the first image adjustment and the second adjustment parameters for use in the second image adjustment as, for example, files.

The operating unit 215 is a processing unit that obtains an operation instruction from the user via an operating device, such as a mouse or a touch panel (not illustrated). In the present embodiment, the user can give, for example, instructions to switch image adjustment modes, instructions to set the first adjustment parameters for use in the first image adjustment, and instructions to set the second adjustment parameters for use in the second image adjustment, via the operating unit 215. In the present embodiment, under the instructions to switch the image adjustment modes, one of an image adjustment mode suitable for the SDR environment (hereinafter referred to as an SDR image adjustment mode) and an image adjustment mode suitable for the HDR environment (hereinafter referred to as an HDR image adjustment mode) is selected. Details of the switching of the image adjustment modes according to the user operation will be described later. Under the instructions to set the first adjustment parameters, respective setting values for white balance processing, digital gain processing, noise reduction processing, lens characteristics correction processing, image capturing mode, γ processing, and the like are input or selected. Under the instructions to set the second adjustment parameters, respective setting values for RGB tone curve adjustment, specific-color adjustment (8-axis color adjustment), partial adjustment, copy stamp processing, trimming processing, rotation processing, scaling processing, and the like are input, selected, or the like. In the case where a first adjustment parameter set or a second adjustment parameter set are separately prepared and held in the storage unit 214, the user can give instructions to read the adjustment parameter set from the storage unit 214 via the operating unit 215. The instructions from the user via the operating unit 215 are sent to the CPU 201. Thus, the CPU 201 controls operations of the first adjusting unit 211 and the second adjusting unit 212 according to the image adjustment mode selected by the user. In the case where instructions to set the first adjustment parameters are given from the user, the CPU 201 sets the first adjustment parameters to the first adjusting unit 211. In the case where instructions to set the second adjustment parameters are given from the user, the CPU 201 sets the second adjustment parameters to the second adjusting unit 212. In the case where the CPU 201 has read the first adjustment parameter set from the storage unit 214 according to the read instructions from the user, the CPU 201 sets the first adjustment parameter set to the first adjusting unit 211. In the case where the CPU 201 has read the second adjustment parameter set from the storage unit 214 according to the read instructions from the user, the CPU 201 sets the second adjustment parameter set to the second adjusting unit 212.

The first adjusting unit 211 is a processing unit that executes the first image adjustment according to the image adjustment mode selected by the user via the operating unit 215. The first adjusting unit 211 is configured to switch and perform, on the raw image, the first dynamic range image adjustment suitable for the first dynamic range and the second dynamic range image adjustment suitable for the second dynamic range wider than the first dynamic range. In other words, when the HDR image adjustment mode is selected, the first adjusting unit 211 executes the HDR image adjustment (the second dynamic range image adjustment), and when the SDR image adjustment mode is selected, the first adjusting unit 211 executes the SDR image adjustment (the first dynamic range image adjustment).

The second adjusting unit 212 is a processing unit that executes the second image adjustment on the image after the first image adjustment by the first adjusting unit 211. The image after the second image adjustment by the second adjusting unit 212 is converted to a display image by the display unit 216 and is sent to a display device (not illustrated) for display.

The detection unit 213 is a processing unit that determines and detects whether readjustment of the adjustment parameters for use in the image adjustment is needed. Although details will be described later, in the present embodiment, the detection unit 213 determines and detects whether it is necessary to readjust, particularly, the second adjustment parameters (including adjustment parameters in the second adjustment parameter set) used in the second image adjustment.

The display unit 216 is a processing unit for generating the display image, described above, and displaying a graphical user interface (GUI) for selecting the image adjustment modes (to be described later), a GUI for notifying the user of a result of detection (to be described later) by the detection unit 213, and the like, and causes a display device (not illustrated) to display the display image and the GUIs.

Figure 3:
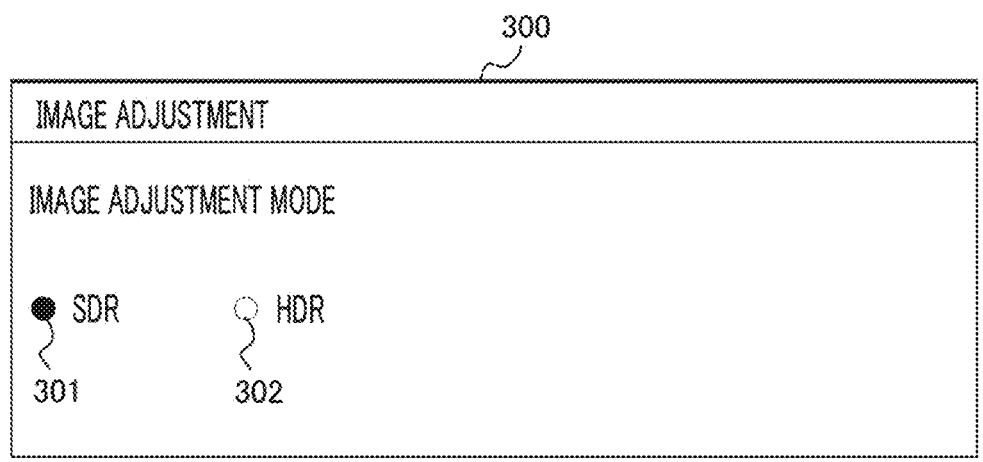
FIG. 3 is a diagram illustrating an example of a graphical user interface (GUI) used when a user switches image adjustment modes.

FIG. 3 is a diagram illustrating an example of a user interface used when the user switches and selects the image adjustment modes in the image processing apparatus 200 of the present embodiment. FIG. 3 illustrates an example GUI in a case where the user selects one of the two modes, the SDR image adjustment mode and the HDR image adjustment mode, by selecting option buttons (radio buttons).

As illustrated in FIG. 3, a GUI 300 for selecting an image adjustment mode includes an option button 301 for selecting the SDR image adjustment mode and an option button 302 for selecting the HDR image adjustment mode. The user can select one of the SDR image adjustment mode and the HDR image adjustment mode by selecting the option button 301 or 302 via the operating unit 215. For example, if the option button 301 is selected, in particular, adjustment parameters suitable for the SDR environment are set to the first adjusting unit 211, and the first adjusting unit 211 executes image adjustment. On the other hand, for example, if the option button 302 is selected, adjustment parameters suitable for the HDR environment are set to the first adjusting unit 211, and the first adjusting unit 211 executes image adjustment.

Figure 4:
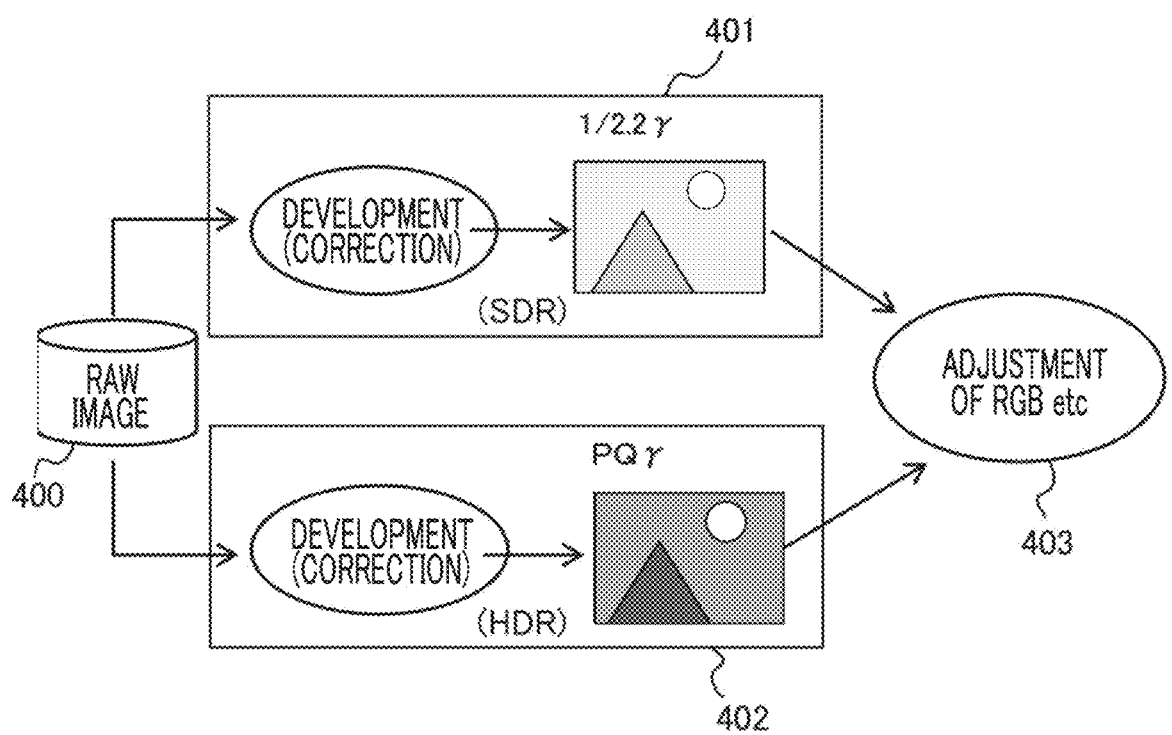
FIG. 4 is a diagram illustrating a flow of image adjustment processing according to a result of selection of the image adjustment modes.

FIG. 4 is a diagram illustrating a flow of image adjustment processing according to a result of selection of the image adjustment modes as illustrated in FIG. 3.

The first adjusting unit 211 in FIG. 2 receives a raw image 400 in the record file obtained by the image input unit 210. For example, if the selected image adjustment mode is the SDR image adjustment mode, the first adjusting unit 211 performs SDR image adjustment 401. The SDR image adjustment 401 in this case includes γ processing using, for example, γ characteristic of 1/2.2 particularly suitable for SDR display, after the development processing and the like. On the other hand, for example, if the selected image adjustment mode is the HDR image adjustment mode, the first adjusting unit 211 performs HDR image adjustment 402. The HDR image adjustment 402 in this case includes γ processing using, for example, γ characteristic of the PQ system particularly suitable for HDR display, after the development processing and the like.

Thereafter, the second adjusting unit 212 performs second image adjustment 403, such as RGB tone curve adjustment, on the image data after the first image adjustment (the SDR image adjustment 401 or the HDR image adjustment 402) by the first adjusting unit 211.

The image processing apparatus 200 of the present embodiment is capable of switching the SDR image adjustment mode and the HDR image adjustment mode, as described above. The image processing apparatus 200 of the present embodiment is also capable of setting adjustment parameters that the user freely specifies or an adjustment parameter set separately prepared. Meanwhile, characteristics of an image subjected to the SDR image adjustment and an image subjected to the HDR image adjustment substantially differ. For this reason, for example, if adjustment parameters are continuously used when the image adjustment modes are switched, if adjustment parameters that the user freely specifies are set, or if adjustment parameters separately prepared are set, the image can be an image with characteristics different from the characteristics expected in the image adjustment. This tends to occur, particularly, in the second image adjustment after the SDR image adjustment in the first image adjustment or in the second image adjustment after the HDR image adjustment in the first image adjustment.

Accordingly, in the present embodiment, the detection unit 213 detects whether the second adjustment parameters for use in the second image adjustment need readjustment.

At that time, the detection unit 213 first determines whether to execute processing for detecting necessity of the readjustment of the second adjustment parameters according to, for example, whether switching between the SDR image adjustment mode and the HDR image adjustment mode has been performed. When switching between the SDR image adjustment mode and the HDR image adjustment mode has been performed, the detection unit 213 executes the processing for detecting necessity of the readjustment of the second adjustment parameters.

The detection unit 213 determines whether to execute the processing for detecting necessity of the readjustment of the second adjustment parameters according to whether a first adjustment parameter set that causes switching to the SDR image adjustment or the HDR image adjustment has been set. When the first adjustment parameter set that causes switching to the SDR image adjustment or the HDR image adjustment has been set, the detection unit 213 executes the processing for detecting necessity of the readjustment of the second adjustment parameters.

Next, the detection unit 213 determines whether the second adjustment parameters for use in the second image adjustment are adjustment parameters with which images with different characteristics are formed in SDR display and HDR display, as the processing for detecting necessity of readjustment of the second adjustment parameters. In other words, the detection unit 213 determines whether an image having characteristics different from characteristics that the user expected is formed, when the second adjustment parameters for use in the second image adjustment are used. If the detection unit 213 determines that the second adjustment parameters are adjustment parameters with which images with different characteristics are formed in SDR display and HDR display, the detection unit 213 detects that readjustment of the second adjustment parameters is needed. In contrast, if the detection unit 213 determines that the second adjustment parameters for use in the second image adjustment are adjustment parameters with which images with different characteristics are not formed in SDR display and HDR display, the detection unit 213 determines that readjustment of the second adjustment parameters is not needed.

When the detection unit 213 detects that readjustment of the second adjustment parameters for use in the second image adjustment is needed, the detection unit 213 instructs the display unit 216 to explicitly notify the user of the detection result. In other words, the detection unit 213 and the display unit 216 are configured to, in response to an operation for switching the first dynamic range image adjustment and the second dynamic range image adjustment by a user, make a notification about an adjustment parameters used in the second image adjustment. Examples of the explicit notification to the user on the display unit 216 include a text message or icon indicating that readjustment is needed and text messages or icons respectively indicating the second adjustment parameters that need readjustment. Such explicit notifications allow the user to recognize that readjustment of the second adjustment parameters is needed and to readjust the second adjustment parameters.

If the detection unit 213 detects that readjustment of the second adjustment parameters is needed, the second adjusting unit 212 deletes the second adjustment parameters that are detected to need readjustment. The second adjusting unit 212 clears the image adjustment related to the deleted second adjustment parameters (returns a state of the second adjustment parameters to a state before the adjustment). When readjustment of the second adjustment parameters is performed by the user operation via the operating unit 215, the second adjusting unit 212 executes the second image adjustment using the readjusted second adjustment parameters. At least part of the second adjustment parameters that need readjustment may be changed by the CPU 201 so as to meet user's intention as much as possible (so as to compensate a change in image characteristics caused by the switching of the first image adjustment as much as possible) by storing or learning the change in advance.

Figure 5:
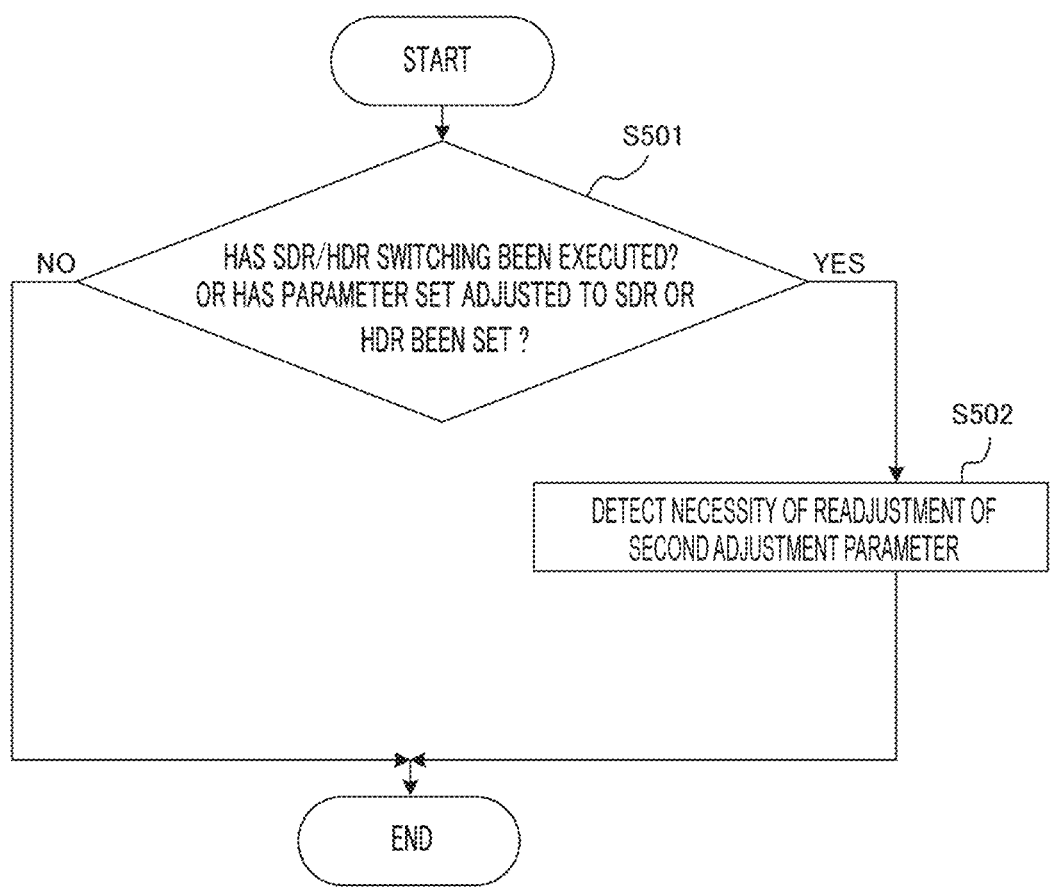
FIG. 5 is a flowchart of processing for determining whether to execute processing for detecting necessity of readjustment.

FIG. 5 is a flowchart of the processing performed by the detection unit 213 of the present embodiment for determining whether to execute the processing for detecting necessity of readjustment of the second adjustment parameters for use in the second image adjustment.

In step S501, the detection unit 213 determines whether switching from the SDR image adjustment mode to the HDR image adjustment mode or switching from the HDR image adjustment mode to the SDR image adjustment mode has been executed. In step S501, the detection unit 213 also determines whether the first adjustment parameter set, which is separately prepared after being adjusted to include the first adjustment parameters suitable for the SDR environment or the HDR environment, has been set. If the detection unit 213 determines that switching between the image adjustment modes has not been executed, the detection unit 213 ends the processing of the flowchart in FIG. 5 without performing further processing. If the detection unit 213 determines that the first adjustment parameter set, which is separately prepared after being adjusted to include the first adjustment parameters suitable for the SDR environment or the HDR environment, has not been set, the detection unit 213 ends the processing of the flowchart in FIG. 5 without performing further processing.

In contrast, if in step S501 the detection unit 213 determines that switching between the image adjustment modes has been performed, the detection unit 213 advances the processing to step S502. If in step S501 the detection unit 213 determines that the first adjustment parameter set, which is separately prepared after being adjusted to include the first adjustment parameters suitable for the SDR environment or the HDR environment, has been set, the detection unit 213 advances the processing to step S502. In step S502, the detection unit 213 executes processing for detecting necessity of readjustment of the second adjustment parameters. After step S502, the detection unit 213 ends the processing of the flowchart in FIG. 5.

Figure 6:
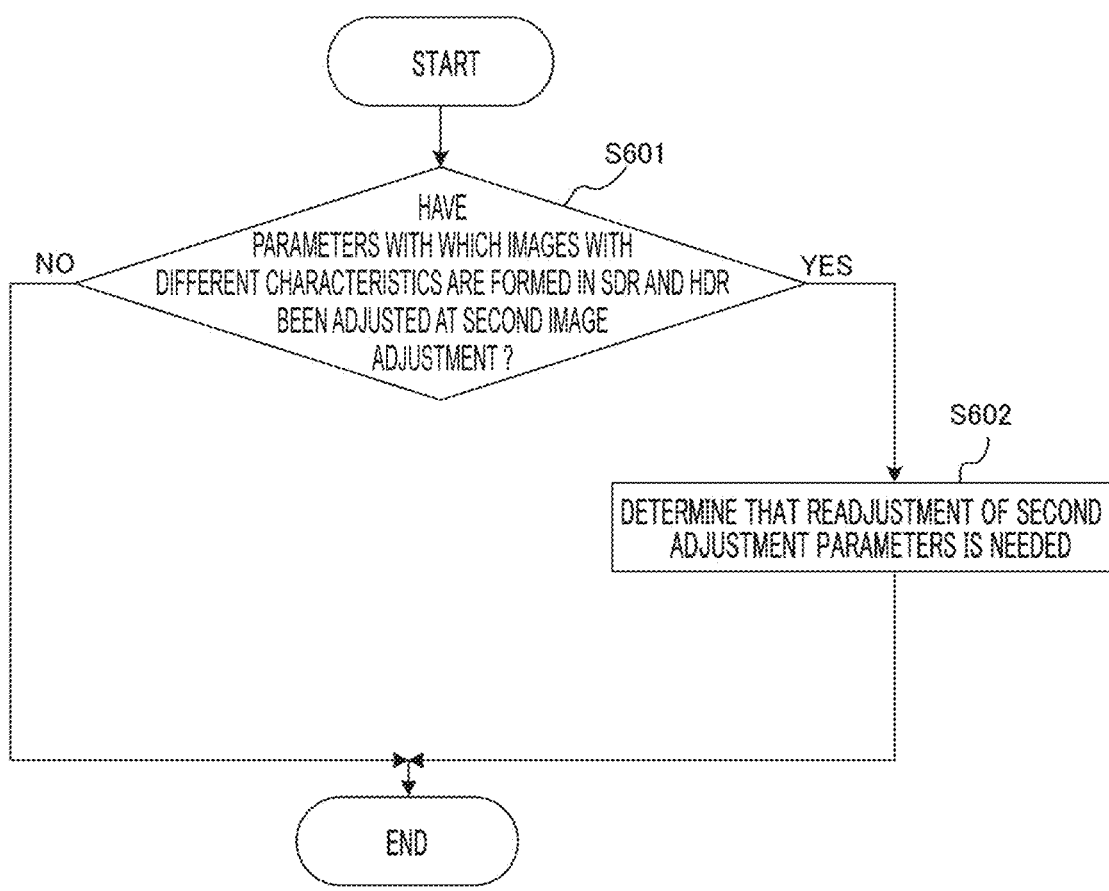
FIG. 6 is a flowchart of the processing for detecting necessity of readjustment.

FIG. 6 is a flowchart of a flow of the processing for detecting necessity of readjustment of the second adjustment parameters, which is performed by the detection unit 213 in step S502 in FIG. 5.

In step S601, the detection unit 213 determines whether the second adjustment parameters with which images with different characteristics are formed in SDR display and HDR display are adjusted at the second image adjustment performed by the second adjusting unit 212. In step S601, the detection unit 213 determines, when a second adjustment parameter set separately prepared has been set, whether the second adjustment parameter set includes second adjustment parameters with which images with different characteristics are formed in SDR display and HDR display. That is, the detection unit 213 determines whether second adjustment parameters that are incompatible between SDR display and HDR display have been adjusted or set. In other words, the detection unit 213 determines whether, among the second adjustment parameters available in the second image adjustment, second adjustment parameters that depend on a γ characteristic of γ processing performed in the first image adjustment have been adjusted or set. Examples of the second adjustment parameters that depend on the γ characteristic at the first image adjustment include adjustment parameters for RGB tone curve adjustment and specific-color adjustment (8-axis color adjustment). In contrast, second adjustment parameters with which images with different characteristics are not formed in SDR display and HDR display, that is, second adjustment parameters that are compatible between SDR display and HDR display are second adjustment parameters that do not depend on the γ characteristic of the γ processing performed at the first image adjustment. Examples of the second adjustment parameters that do not depend on the γ characteristic at the first image adjustment include adjustment parameters for copy stamp processing, trimming processing, rotation processing, and scaling processing. The detection unit 213 does not deal with these second adjustment parameters as adjustment parameters that need readjustment.

If in step S601 the detection unit 213 determines that second adjustment parameters with which images with different characteristics are formed in SDR display and HDR display have not been adjusted or set, the detection unit 213 ends the processing of the flowchart in FIG. 6 without performing further processing.

In contrast, if in step S601 the detection unit 213 determines that second adjustment parameters with which images with different characteristics are formed in SDR display and HDR display have been adjusted or set, the detection unit 213 advances the processing to step S602. In step S602, the detection unit 213 determines (detects) that readjustment of the second adjustment parameters is needed. After the processing in step S602, the detection unit 213 ends the processing of the flowchart in FIG. 6.

Figure 7:
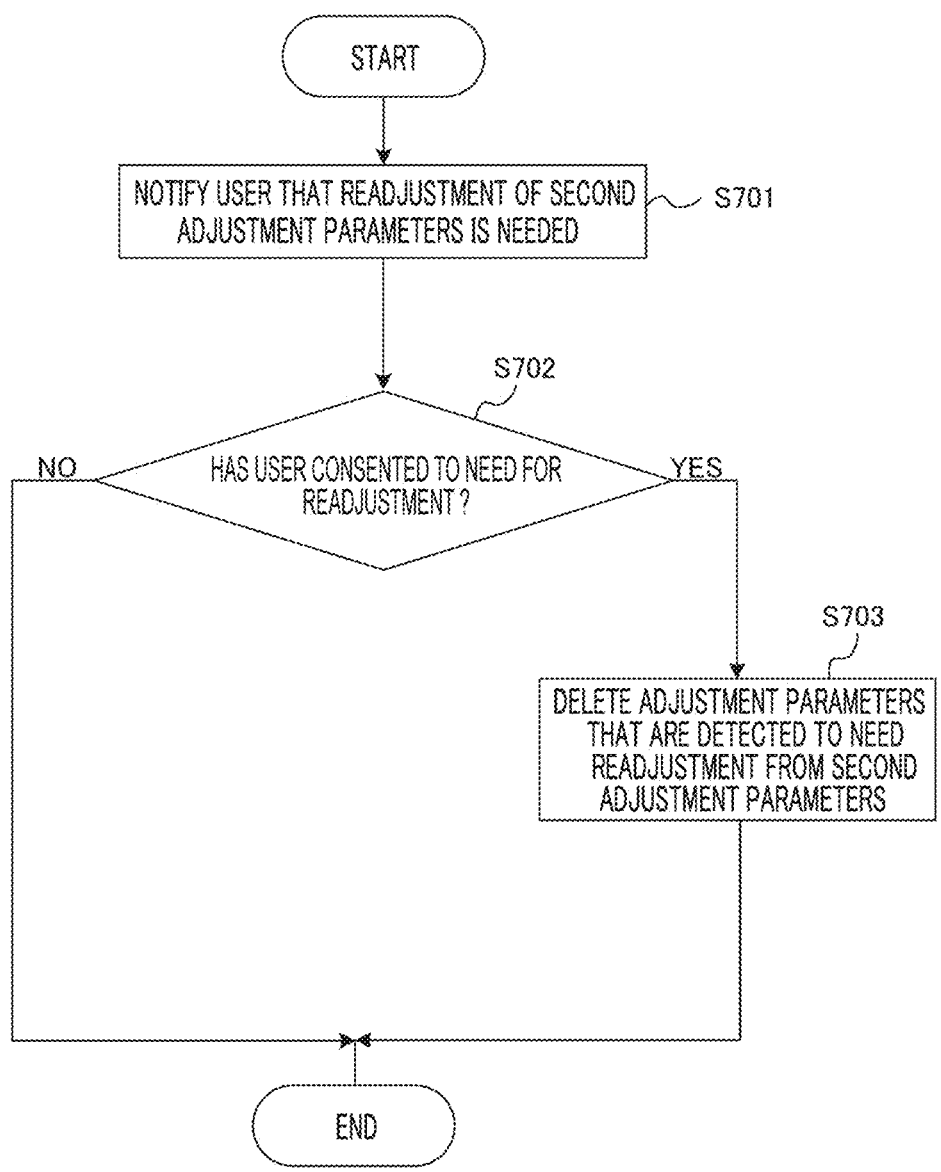
FIG. 7 is a flowchart of processing for deleting adjustment parameters that need readjustment.

FIG. 7 is a flowchart of a flow of processing from notification to the user to deletion of the adjustment parameters, in the case where the detection unit 213 detects that readjustment of the second adjustment parameters is needed.

If the detection unit 213 detects that readjustment of the second adjustment parameters is needed as described above, then in step S701 the detection unit 213 instructs the display unit 216 to explicitly notify the user of the detection result. The explicit notification performed by the display unit 216 allows the user to recognize that readjustment of the second adjustment parameters is needed.

Next, in step S702, the operating unit 215 determines whether an operation indicating consent to necessity of the readjustment has been input from the user. Specific example of input operation indicating the user's consent will be described later. If the operating unit 215 determines that no consent to the readjustment of the adjustment parameters has been given from the user, the second adjusting unit 212 ends the processing of the flowchart in FIG. 7 without performing further processing.

In contrast, if in step S702 the operating unit 215 determines that consent to the readjustment of the adjustment parameters has been given, the second adjusting unit 212 advances the processing to step S703. In step S703, the second adjusting unit 212 deletes the second adjustment parameters that are detected to need readjustment from the second adjustment parameters dealt in the second image adjustment, and clears image adjustment related to the deleted second adjustment parameters (returns a state of the second adjustment parameters to a state before the adjustment). After the processing in step S703, the second adjusting unit 212 ends the processing of the flowchart in FIG. 7.

Figure 8:
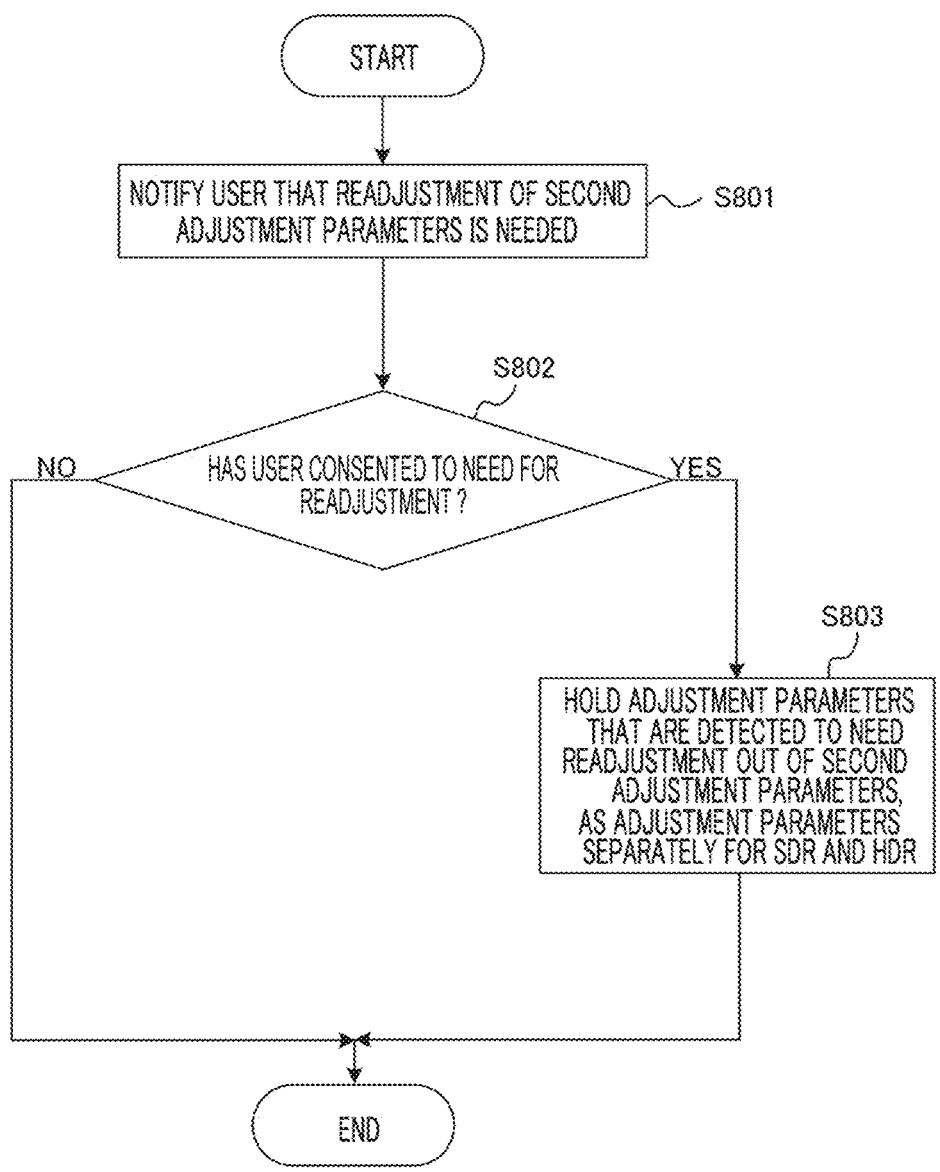
FIG. 8 is a flowchart of processing for storing adjustment parameters.

FIG. 8 is a flowchart of a flow of processing from notification to the user, through execution of the readjustment of the adjustment parameters, until the adjustment parameters are held, in the case where the detection unit 213 detects that readjustment of the second adjustment parameters is needed.

If the detection unit 213 detects that readjustment of the second adjustment parameters is needed, as described above, then in step S801 the detection unit 213 instructs the display unit 216 to explicitly notify the user of the detection result, as in step S701. In step S802, the operating unit 215 determines whether an operation indicating consent to necessity of the readjustment has been input from the user, as in step S702. If the operating unit 215 determines that no consent to the readjustment of the adjustment parameters has been given from the user, the second adjusting unit 212 ends the processing of the flowchart in FIG. 8 without performing further processing.

In contrast, if in step S802 the operating unit 215 determines that consent to the readjustment of the adjustment parameters has been given, the second adjusting unit 212 advances the processing to step S803. In step S803, the second adjusting unit 212 executes second image adjustment using the second adjustment parameters readjusted according to a user operation via the operating unit 215. The storage unit 214 separately stores, in the RAM 203, the second adjustment parameters that are detected to need readjustment and the second adjustment parameters readjusted by the second adjusting unit 212. In other words, the storage unit 214 causes the RAM 203 to store the second adjustment parameters before and after the readjustment as separate files. After the processing in step S803, the second adjusting unit 212 ends the processing of the flowchart in FIG. 8.

Figure 9A:
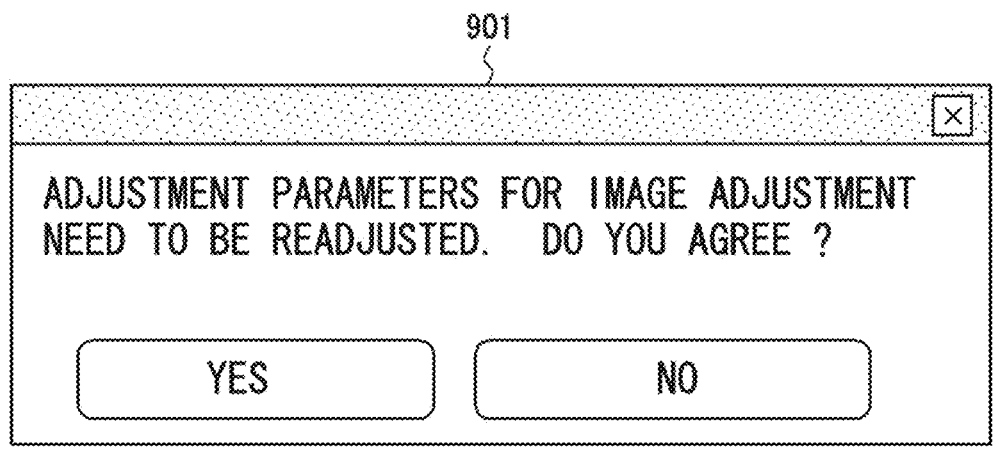
FIGS. 9A and 9B are diagrams of example GUIs illustrating a notification to the user about readjustment of adjustment parameters.
Figure 9B:
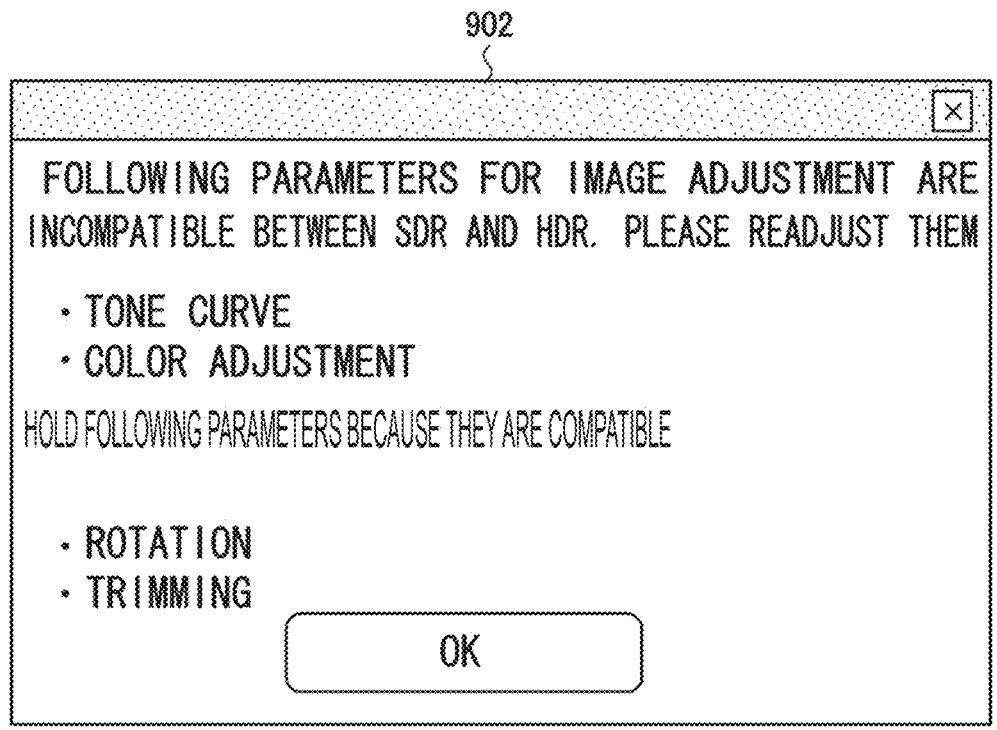

FIG. 9A and FIG. 9B are diagrams of example GUIs illustrating details of the notification to the user about the readjustment of the second adjustment parameters and details of asking for consent to the readjustment.

A GUI 901 in FIG. 9A is an example in which a notification message to the user that readjustment of the adjustment parameters is needed and buttons (YES and NO buttons) asking the user for consent to readjust the adjustment parameters are displayed. If the user selects YES button on the GUI 901 by, for example, clicking or touching, the operating unit 215 determines that the user has consented. The GUI 901 then shifts to a GUI for setting adjustment parameters or the like at the second image adjustment (not illustrated). In contrast, if the user selects NO button, the second adjusting unit 212 ends the processing without performing further processing.

A GUI 902 in FIG. 9B is an example in which a notification message to the user with listing adjustment parameters that need readjustment and adjustment parameters that need no readjustment, described above, and OK button, which is selected when the user has confirmed the details of the notification, are displayed. When, for example, the user clicks or touches the OK button on the GUI 902, the operating unit 215 determines that the user has confirmed contents of the description. In the example of the GUI 902 in FIG. 9B, the adjustment parameters that need readjustment are "tone curve" and "color adjustment", and adjustment parameters that need no readjustment are "rotation" and "trimming".

As described above, when adjustment parameters with which images with different characteristics are formed in the SDR environment and the HDR environment are adjusted or set, the image processing apparatus of the present embodiment detects that readjustment of the adjustment parameters is needed and notifies the user of the detection result. This allows the image processing apparatus of the present embodiment to prevent possibility of forming an image with characteristics different from characteristics expected in the image adjustment. Readjusting the adjustment parameters allows image adjustment suitable for each of the SDR environment and the HDR environment, allowing displaying of images with suitable characteristics in the SDR environment and the HDR environment.

The information processing apparatus described in Japanese Patent Laid-Open No. 2018-60075 described above is configured to notify the user of necessity of readjustment when an image is to be displayed in an environment different from the environment at image adjustment. In other words, in the case of the technique described in Japanese Patent Laid-Open No. 2018-60075, detection whether an image with characteristics different from the characteristics expected by the user can be displayed and a notification of the detection result are not made in advance before image adjustment is performed, unlike in the present embodiment.

According to the above embodiment, it is possible to prevent that an image with characteristics different from characteristics expected in image adjustment is formed, and adjust the adjustment parameters at the image adjustment so as to match the respective characteristics of the SDR environment and the HDR environment.

Other Embodiments

Embodiment(s) can also be realized by a computer of a system or apparatus that reads out and executes computer executable instructions (e.g., one or more programs) recorded on a storage medium (that may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s).

The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-148408, filed Aug. 7, 2018, which is hereby incorporated by reference herein in its entirety.

What is claimed is:

1. An image processing apparatus comprising:
a processing unit configured to obtain a selection instruction of an image adjustment mode from a user;
a first adjusting unit configured to perform SDR gamma processing suitable for a standard dynamic range (SDR) on a raw image in a case where the user selects an SDR image adjustment mode and HDR gamma processing suitable for a high dynamic range (HDR) on the raw image in a case where the user selects an HDR image adjustment mode;
a second adjusting unit configured to perform a second image adjustment on an image after the SDR gamma processing or the HDR gamma processing; and
a notification unit configured to, in a case where an operation for switching the image adjustment mode is performed after the second adjusting unit performs the second image adjustment, make a notification about the second image adjustment,
wherein the notification unit
1) performs the notification in a case where a tone curve adjustment of the image or a color adjustment of the image is performed as the second image adjustment, and
2) does not perform the notification in a case where an adjustment for rotating the image, an adjustment for multiplying the image, an adjustment for copying and pasting a region in the image, or an adjustment for trimming the image is performed as the second image adjustment, and
wherein the processing unit, the first adjusting unit, the second adjusting unit, and the notification unit are implemented via at least one processor.

2. The image processing apparatus according to claim 1, wherein in the case where the operation for switching is performed, the notification unit makes a notification that readjustment of the adjustment parameter used in the second image adjustment is needed.

3. The image processing apparatus according to claim 2, further comprising
a detection unit configured to detect necessity of the readjustment,
wherein the first adjusting unit, the second adjusting unit, the notification unit, and the detection unit are implemented via at least one processor.

4. The image processing apparatus according to claim 3, wherein
in the case where the operation for switching is performed, the detection unit performs processing for detecting necessity of the readjustment.

5. The image processing apparatus according to claim 3, wherein
in a case where an adjustment parameter that causes switching between the SDR gamma processing and the HDR gamma processing is set to the first adjusting unit, the detection unit performs processing for detecting necessity of the readjustment.

6. The image processing apparatus according to claim 3, wherein
in a case where an adjustment parameter for use in the second image adjustment is an adjustment parameter with which images with different characteristics are formed in the SDR and the HDR, the detection unit detects that the readjustment is needed.

7. The image processing apparatus according to claim 6, wherein
in a case where the adjustment parameter for use in the second image adjustment is an adjustment parameter that depends on a gamma characteristic of the image after the SDR gamma processing or the HDR gamma processing, the detection unit detects that the readjustment is needed.

8. The image processing apparatus according to claim 7, wherein
the adjustment parameter that depends on the gamma characteristic includes an adjustment parameter for use in at least one of a tone curve adjustment and a color adjustment.

9. The image processing apparatus according to claim 7, wherein
in a case where the adjustment parameter for use in the second image adjustment is an adjustment parameter that does not depend on the gamma characteristic, the detection unit detects that the readjustment is not needed.

10. The image processing apparatus according to claim 9, wherein
the adjustment parameter that does not depend on the gamma characteristic includes an adjustment parameter for use in at least one of an adjustment to rotate an image, an adjustment to scale an image, an adjustment to copy and paste an area in an image, and an adjustment to trim an image.

11. The image processing apparatus according to claim 3, wherein
the second adjusting unit deletes, after the notification is made by the notification unit, an adjustment parameter that is detected by the detection unit to need the readjustment.

12. The image processing apparatus according to claim 3, further comprising
a storage unit configured to store, for an adjustment parameter detected by the detection unit to need the readjustment, the adjustment parameter before the readjustment and an adjustment parameter after the readjustment,
wherein the first adjusting unit, the second adjusting unit, the notification unit, the detection unit, and the storage unit are implemented via at least one processor.

13. The image processing apparatus according to claim 3, wherein
the notification unit makes the notification in such a manner as to list adjustment parameters that are detected by the detection unit to need the readjustment.

14. An image processing method comprising:
obtaining a selection instruction of an image adjustment mode from a user;
performing SDR gamma processing suitable for a standard dynamic range (SDR) on a raw image in a case where the user selects an SDR image adjustment mode;
performing HDR gamma processing suitable for a high dynamic range (HDR) on the raw image in a case where the user selects an HDR image adjustment mode;
performing a second image adjustment on an image after the SDR gamma processing or the HDR gamma processing; and
making a notification about the second image adjustment in a case where an operation for switching the image adjustment mode after performing the second image adjustment,
wherein
1) in a case where a tone curve adjustment of the image or a color adjustment of the image is performed as the second image adjustment, the notification is performed, and
2) in a case where an adjustment for rotating the image, an adjustment for multiplying the image, an adjustment for copying and pasting a region in the image, or an adjustment for trimming the image is performed as the second image adjustment, the notification is not performed.

15. A non-transitory computer-readable storage medium storing a program for causing a computer to execute an image processing method, the image processing method comprising:
obtaining a selection instruction of an image adjustment mode from a user;
performing SDR gamma processing suitable for a standard dynamic range (SDR) on a raw image in a case where the user selects an SDR image adjustment mode;
performing HDR gamma processing suitable for a high dynamic range (HDR) on the raw image in a case where the user selects an HDR image adjustment mode;
performing a second image adjustment on an image after the SDR gamma processing or the HDR gamma processing; and
making a notification about the second image adjustment in a case where an operation for switching the image adjustment mode is performed after performing the second image adjustment
wherein
1) in a case where a tone curve adjustment of the image or a color adjustment of the image is performed as the second image adjustment, the notification is performed, and
2) in a case where an adjustment for rotating the image, an adjustment for multiplying the image, an adjustment for copying and pasting a region in the image, or an adjustment for trimming the image is performed as the second image adjustment, the notification is not performed.

\* \* \* \* \*